(12) United States Patent
Bieniek et al.

(10) Patent No.: US 9,272,467 B2
(45) Date of Patent: Mar. 1, 2016

(54) METHOD FOR PRODUCING A DECORATIVE PART, AND SUCH A DECORATIVE PART

(75) Inventors: Klaus Bieniek, Knittlingen (DE); Norbert Zwiessler, Altenbuch (DE); Rudi Artem, Esslingen (DE); Thomas Weisser, Pforzheim (DE); Manfred Link, Waiblingen (DE); Uwe-Joachim Friedrich, Oestringen (DE)

(73) Assignee: QUIN GMBH, Rutesheim (DE)

( * ) Notice: Subject to any disclaimer, the term of this patent is extended or adjusted under 35 U.S.C. 154(b) by 394 days.

(21) Appl. No.: 13/824,614

(22) PCT Filed: Oct. 10, 2011

(86) PCT No.: PCT/EP2011/005052
§ 371 (c)(1),
(2), (4) Date: Jun. 11, 2013

(87) PCT Pub. No.: WO2012/045476
PCT Pub. Date: Apr. 12, 2012

(65) Prior Publication Data
US 2014/0147605 A1    May 29, 2014

(30) Foreign Application Priority Data
Oct. 9, 2010  (EP) .................................. 10013483

(51) Int. Cl.
*B29C 65/54* (2006.01)
*B29C 45/56* (2006.01)
(Continued)

(52) U.S. Cl.
CPC ........... *B29C 65/542* (2013.01); *B29C 45/0017* (2013.01); *B29C 45/14467* (2013.01);
(Continued)

(58) Field of Classification Search
USPC ............. 264/261, 262, 263, 271.1, 275, 279, 264/279.1, 328.7; 156/304.1, 304.2, 304.5
See application file for complete search history.

(56) References Cited

U.S. PATENT DOCUMENTS

| | | | | | |
|---|---|---|---|---|---|
| 1,837,754 | A | * | 12/1931 | Calmus et al. | H01R 24/58 264/262 |
| 2,275,591 | A | * | 3/1942 | Leonard | B29C 45/0025 249/187.1 |

(Continued)

FOREIGN PATENT DOCUMENTS

| CN | 1756637 A | 4/2006 |
|---|---|---|
| CN | 1938140 A | 3/2007 |

(Continued)

OTHER PUBLICATIONS

PCT International Preliminary Report on Patentability Dated Apr. 9, 2013, Applicant Quin GmbH, Application No. PCT/EP2011/005052, 7 Pages.

(Continued)

*Primary Examiner* — Atul P. Khare
(74) *Attorney, Agent, or Firm* — Brooks Kushman P.C.

(57) ABSTRACT

A method is provided for producing a decorative part that has a closed cross-section having an external visible side and that has at least two support parts to be connected along a connecting joint. The support parts are held spaced at a distance from one another such that a gap is formed between the edges of the support parts which adjoin one another at the connecting joint. The support parts are inserted in at least two halves of a molding tool. A reaction plastic is injected into the molding tool, such that the reaction plastic penetrates the gap. The support parts are moved toward each other such that the gap closes while the reaction plastic is still liquid. The support parts are fixed against each other in this position at least until the plastic has sufficiently cured so as to form a bond seam in the connecting joint.

12 Claims, 4 Drawing Sheets

(51) Int. Cl.
*B29C 65/14* (2006.01)
*B29C 65/42* (2006.01)
*B29C 65/58* (2006.01)
*B29C 65/00* (2006.01)
*B62D 1/06* (2006.01)
*B60R 13/00* (2006.01)
*B29C 65/48* (2006.01)
*B29L 31/32* (2006.01)
*B29C 45/14* (2006.01)
*B29C 45/00* (2006.01)
*B29L 9/00* (2006.01)
*B29L 31/30* (2006.01)
*B29L 31/00* (2006.01)

(52) U.S. Cl.
CPC .......... *B29C45/561* (2013.01); *B29C 65/1406* (2013.01); *B29C 65/1435* (2013.01); *B29C 65/1467* (2013.01); *B29C 65/1483* (2013.01); *B29C 65/42* (2013.01); *B29C 65/483* (2013.01); *B29C 65/58* (2013.01); *B29C 66/547* (2013.01); *B29C 66/81267* (2013.01); *B29C 66/8322* (2013.01); *B60R 13/00* (2013.01); *B62D 1/06* (2013.01); *B29C 45/14311* (2013.01); *B29C 65/425* (2013.01); *B29C 66/81264* (2013.01); *B29C 2045/0063* (2013.01); *B29C 2045/14131* (2013.01); *B29L 2009/00* (2013.01); *B29L 2031/3047* (2013.01); *B29L 2031/3055* (2013.01); *B29L 2031/7102* (2013.01); *B29L 2031/722* (2013.01); *Y10T 428/1352* (2015.01)

(56) References Cited

U.S. PATENT DOCUMENTS

| | | | | |
|---|---|---|---|---|
| 4,040,670 A | * | 8/1977 | Williams | A63C 17/22 156/308.2 |
| 5,792,302 A | * | 8/1998 | Nakada | B29C 44/12 156/293 |
| 6,282,982 B1 | * | 9/2001 | Testa | B29C 70/545 74/552 |
| 6,668,682 B1 | * | 12/2003 | Emeneth | B29C 66/1142 74/552 |
| 6,669,890 B1 | * | 12/2003 | Sato | B29C 45/14467 264/255 |
| 6,797,087 B2 | * | 9/2004 | Hosokawa | B29C 65/0618 156/272.2 |
| 7,147,816 B2 | * | 12/2006 | Nishida | B29C 45/0062 264/255 |
| 7,250,124 B2 | | 7/2007 | Boven et al. | |
| 7,972,462 B2 | | 7/2011 | Yamamoto et al. | |
| 8,540,917 B2 | * | 9/2013 | Yamamoto | B29C 33/12 264/261 |
| 2004/0149074 A1 | | 8/2004 | Menaldo et al. | |
| 2005/0276874 A1 | | 12/2005 | Menaldo et al. | |
| 2008/0277908 A1 | * | 11/2008 | White | B62D 1/04 280/731 |
| 2010/0050808 A1 | | 3/2010 | Min et al. | |
| 2011/0143111 A1 | * | 6/2011 | Yamamoto | B29C 33/12 428/213 |

FOREIGN PATENT DOCUMENTS

| | | |
|---|---|---|
| CN | 101432124 A | 5/2009 |
| CN | 10166518 A | 3/2010 |
| EP | 1442957 A1 | 8/2005 |
| EP | 1884442 A1 | 2/2008 |

OTHER PUBLICATIONS

Chinese Office Action Dated Sep. 1, 2014, Application No. 201180048472.9, 8 Pages.

PCT International Search Report Dated Aug. 12, 2011, Application No. PCT/EP2011/005052, Applicant Quin GmbH.

* cited by examiner

METHOD FOR PRODUCING A DECORATIVE PART, AND SUCH A DECORATIVE PART

CROSS-REFERENCE TO RELATED APPLICATIONS

This application is a U.S. national phase of PCT Application No. PCT/EP2011/005052 filed Oct. 10, 2011 which claims priority to European Application No. 10013483.2 filed Oct. 9, 2010, the disclosures of which are incorporated in their entirety by reference herein.

TECHNICAL FIELD

The invention relates to a method for producing a decorative part, in particular for a motor vehicle, and a decorative part.

BACKGROUND

In motor vehicles, numerous decorative parts are employed which optionally also assume functional jobs in the interior of the vehicle, but which must in particular be of a high-quality optical appearance. This in particular applies to steering wheels and comparable components that comprise an external visible side and at least two support parts connected along a connecting joint. The support parts are provided with a decorative layer facing the visible side. The decorative layer itself is in turn provided with a transparent cover layer on the visible side. The decorative layer can be formed, for example, of precious wood veneer, woven, sheet metal, or the like whose optical appearance shows to advantage through the transparent cover layer. The transparent cover layer here also functions as a protection of the decorative layer and the provision of the desired haptic properties.

Taking into consideration the high demands of the optical and haptic qualities and resistance to ageing, the production expenditure for such decorative parts is high. The two support parts, including the decorative layers applied on it, must be connected or glued to each other at the connecting joint so neatly that a connecting seam is formed that is optically and haptically barely perceptible. This requires one or several complex working steps. In addition, the transparent cover layer, for which a thick-film clear varnish is often used, must be applied. In production, the latter requires a cost-intensive manual operation, in particular during reworking. Therefore, efforts are being made to produce the transparent cover layer by so-called "in mold coating" with an out-of-tool surface. In the process, the blank of the decorative part is placed into an injection mold, and the transparent plastic material is injected for forming the cover layer. In such production methods, two different plastics are employed.

In a first variant, a thermoplastic is fused in an extruder and injected into the injection mold at high pressure. Since the thermoplastic is formed of long-chain polymers and is highly viscous even in the form of a melt, high injection pressures and temperatures are required. The blank inserted in the mold must be able to withstand these pressures and temperatures which is why such a method cannot be employed for any decorative part. In particular, those decorative parts having a cross-section with a circumferentially enclosed visible side cannot be coated, as is the case, for example, with the rim of a steering wheel. The rim of a steering wheel typically has a supporting metal core around which shock-absorbing rigid foam is foamed. The rigid foam, including its decorative layer applied on the outer side, would yield under the influence of the high injection pressure, so that no dimensional stability and deformation resistance can be ensured.

As an alternative, so-called reaction plastics are employed wherein at least two separate plastic components are mixed in a mixing head arranged directly at the outer side of the injection mold, whereby then a chemical reaction is started that leads to a polymer reaction (polyaddition, polymerization). The mixed components are injected into the injection mold. As long as the polymer reaction is not completed, the viscosity of the mixture is low compared to a plastic melt, so that lower injection pressures can be applied. It is thus possible to also coat more sensitive blanks of decorative parts by injection.

Here, however, numerous disadvantages also arise: The curing or polyaddition process takes some time within which the blank coated by injection must remain in the injection mold thereby limiting cycle times in production. To nevertheless obtain a short cycle time, reaction plastics with a very short pot life of about four to seven seconds are prepared. The pot life is thus shorter than the cycle time during which the workpiece or the decorative part remains in the die. While the finished decorative part can then be removed from the mold, partly or completely cured plastic material is also present at the outlet of the mixing head and can lead to plug formation or clogging of the injection channel. At least, however, there is a risk in that individual cured particles get into the mold cavity during the subsequent injection operation and lead to optical impurities there and thus to a deterioration of product quality.

The high affinity of the reaction plastics to metal is also problematic. The injected plastic material tends to adhere to the surface of the mold cavity. Ejection of the finished component is difficult which is why parting agents must be used. In this case, however, despite any efforts, no real out-of-tool surface is formed because the additional use of a parting agent is required. One has also tried to provide the reaction plastic with a separating additive. The additive is initially uniformly distributed in the plastic material and develops its whole effect only after a certain time that it needs to deposit at the surface. With the aforementioned short pot lives, however, the available period is much too short to achieve a sufficient development of the separating effect of the additive.

A further problem not yet solved in prior art is that with decorative parts with at least two support parts, the latter must be precisely connected to each other in a complicated operation before the decorative layer is injected around them, so that the injection result is also satisfactory in the region of the seam. The at least two support parts must be joined to each other so neatly in a separate preparing working step, for example by ultrasonic welding or by gluing, that the decorative layers applied onto it also adjoin practically without any seam, while no detachments, fractures, and in particular impurities of the visible side occur, for example by the employed adhesive. Therefore, despite the high efforts, a cost-boosting amount of rejects is inevitable.

SUMMARY

The object underlying the invention is to provide a method for producing a decorative part with at least two support parts which permits an optically perfect and mechanically reliable connection of the two support parts with each other while cost effectiveness is simultaneously improved.

Another object underlying the invention is to further develop a decorative part of the type mentioned in the beginning such that the interconnection of at least two of its support parts is facilitated by its constructive design.

According to the inventive method, the support parts of the decorative part are first held at a distance with respect to each other such that a gap is formed between edges of the support parts that adjoin at the connecting joint. This can be accomplished, for example, by a suited design of the molding tool halves or by fixing means of at least one of the support parts. Fixing with a gap can be effected, for example, with frictional engagement. In particular, the support parts of the decorative part are held at a distance to each other in a latching manner in a first latch stage while the gap is formed. The latching ensures that a defined clearance of in particular smaller than 2 mm, and in particular about 1.5 mm, is maintained. The latching can be easily caused manually or in an automated manner. Preferably, at least one of the support parts is to this end provided with first fixing means which hold the support parts at a distance to each other during the production process such that the aforementioned gap is formed between the edges of the support parts which adjoin at the connecting joint.

The support parts are placed into at least two molding tool halves. An in particular transparent reaction plastic is injected into the at least two molding tool halves, such that the reaction plastic penetrates the gap.

Subsequently, the support parts held spaced at a distance to each other are moved toward each other such that the gap closes while the transparent reaction plastic is still liquid. In this state or in this relative position with respect to each other, the support parts are fixed against each other at least until the reaction plastic has sufficiently cured so as to form a bond seam in the connecting joint.

Fixing with a closed gap can also be done by fixing means of the mold halves. In particular, at least one of the support parts is provided with second fixing means which fix the support parts against each other during the production process with a closed gap. Here, too, fixing can be done, for example, by frictional engagement. Preferably, the support parts are fixed against each other in a latching manner in a second latch stage with a closed gap. The second latch stage ensures that the two support parts including the decorative layers applied on them adjoin each other quasi without any gap and that this position is also maintained without the action of any external holding force, but under the effect of the injection pressure.

The first fixing means and/or the second fixing means are suitably formed by latches and latch edges allocated to the latches. Preferably, the first fixing means and/or the second fixing means are arranged directly adjacent to the edges of the support parts, whereby the fixing effect is achieved directly at the place where the exact position fixing is decisive: The edges can practically not yield and thereby cannot lose their mutual exact positional orientation. To further support the exact position orientation, the first fixing means and the second fixing means are arranged alternately along the connecting joint, so that no technically relevant sections without fixing support are present in the first fixing stage, and neither in the second fixing stage.

In addition, it can be suitable to arrange, adjacent to the edges, centering means, in particular in the form of centering projections for the mutual alignment of the support parts. These centering means also prevent the edges from drifting away from each other not even in sections and rather take care that the edges of the individual support parts are exactly aligned with respect to each other at least approximately along their total length during the complete joining process.

In the position where the support parts are fixed against each other without gap they are fixed against each other at least until the in particular transparent reaction plastic has sufficiently cured so as to form a bond seam in the connecting joint. Sufficient curing does not necessarily mean complete curing here. The curing process must rather only have progressed sufficiently for the coated blank to be removed from the injection mold without damaging the in particular transparent plastic material.

Altogether, a method and a decorative component are provided thereby, wherein first a precise gap is formed in which the plastic material can penetrate to form the connecting joint in a defined manner. The gap is uniformly filled by the injection process. In the subsequent closing of the gap between the mold halves, a nearly invisible and gap-free bond seam without defective points and of high stability is achieved. The invisibility of the bond seam is further supported by the optional use of a transparent plastic material. When a transparent cover layer is applied later or simultaneously, the transparent bond seam and the transparent cover layer join up all-over in such a way that the bond seam as such can practically no longer be perceived visually and haptically. Mechanical integrity and esthetic overall impression are combined with each other, simultaneously with high process reliability and productivity.

It might be suitable to separate the joining process and the coating process and to carry them out sequentially. In a preferred further development, the support parts in the at least two molding tool halves are coated with the transparent reaction plastic on the outer side of the decorative layer with respect to the cross-section, such that the transparent reaction plastic also penetrates the gap. The support parts held spaced at a distance are then moved toward each other such that the gap closes while the transparent reaction plastic is still liquid. The support parts are fixed against each other in this position at least until the transparent reaction plastic has sufficiently cured so as to form the transparent cover layer on the outer side of the decorative layer and to form the bond seam in the connecting joint monolithically formed in one-piece with the cover layer.

Joining and transparent coating are carried out in one single automated processing step resulting in a high quality level and a small amount of rejects, thereby essentially improving cost effectiveness. One can achieve a surface that is optically and haptically perfect in particular also in the seam region between the two support parts, and this within short cycle times and without any manual reworking, while simultaneously an all-over joint is formed that is optically reduced to a minimum and is tough after it has completely cured.

In a suitable further development of the method, one insert each is inserted into the molding tool halves allocated to the visible side, the inserts being provided for forming the cover layer on the visible side. Subsequently, the support parts held spaced at a distance to each other with the gap are placed between the molding tool halves. The molding tool halves are closed while a hollow space is formed between the decorative layer and the inserts. The transparent reaction plastic is injected into the hollow space. The support parts onto which the reaction plastic has been injected and which are connected at the connecting joint are removed from the molding tool half together with the inserts adhering to them.

The low-viscosity, that means thin fluid, reaction plastic can be injected into the mold at a low injection pressure. Even mechanically sensitive decorative part blanks withstand this low injection pressure even when the surface to be coated is annularly closed and the injection pressure thus acts from all sides. The problem of the affinity of the reaction plastic to the metallic mold surface is eliminated by using the inserts: These can remain adhered to the surface of the reaction plastic as shaping parts and be removed from the molding tool together with the decorative part.

Depending on the employed pot life, the curing or polyaddition of the plastic material can be effected completely or partially in the mold. Preferably, the support parts onto which the reaction plastic has been injected are removed from the molding tool halves together with the inserts adhering to them before the reaction plastic has completely cured or polymerized. The complete curing or polymerization of the reaction plastic with the inserts adhering to it is subsequently effected outside the molding tool halves. This becomes possible by the adhering inserts which maintain the surface contour of the plastic although the polymer reaction is not yet completed. The aforementioned fixing and/or centering means hold the support parts reliably in position even after they have been removed from the molding tool halves until polymer reaction is completed and a stable adhesive connection on the one hand and a cover layer surface capable of bearing on the other hand are formed thereby. The unit of decorative parts and inserts can be removed from the molding tool halves and subjected to further curing so that with a short cycle time, the mold is free for the injection operation of the next part already after a short time. For this, the mold only has to be equipped with a new set of inserts, preparing it for the next injection operation. The method according to the invention permits the use of reaction plastics with a pot life that is longer than the cycle time of the method based on the stay of the component in the molding tool, while short cycle times are maintained. So, the decorative part is removed from the molding tool halves together with the supporting inserts while the reaction plastic is still in a not completely reacted state. This clearly facilitates the handling of the otherwise critical reaction plastic since no clogging of the mixing head or the injection channels must be expected.

The long pot life moreover permits the use of a reaction plastic which is provided with an additive for reducing adherence to the insert. Due to the long pot life, sufficient time remains for the uniformly dissolved and distributed additive to deposit at the parting plane between the cover layer and the insert and to develop its whole separation effect there. Upon curing or polyaddition, respectively, the insert can be easily removed from the surface of the decorative part without excessively high adhesive forces having to be overcome.

DESCRIPTION OF THE DRAWINGS

Below, an embodiment of the invention will be illustrated more in detail with reference to the appended figures. In the figures.

DETAILED DESCRIPTION

Figure 1:
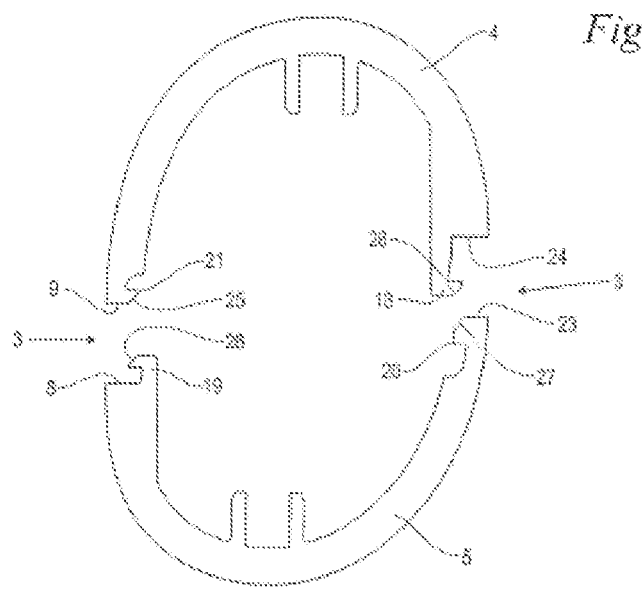
FIG. 1 shows, in a cross-sectional view, two not yet interconnected support parts of a decorative part schematically shown in FIG. 8 with details of latch means attached to it.
Figure 6:
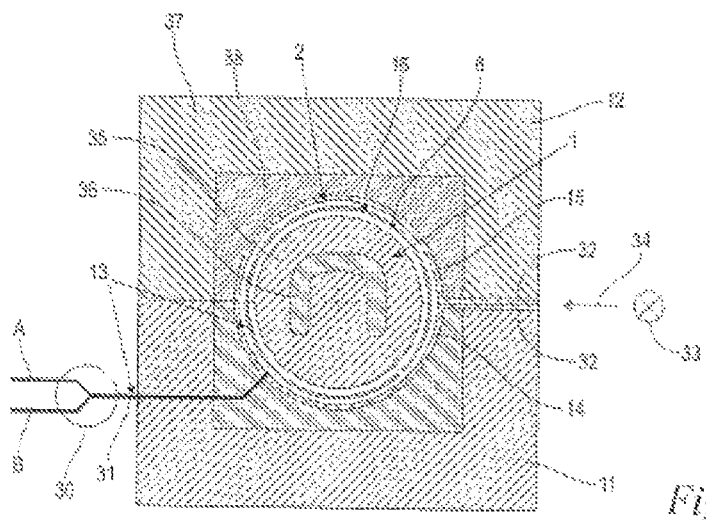
FIG. 6 shows the arrangement according to FIG. 4 with the gap between the two support parts according to FIG. 5 being closed for finally connecting the two support parts.
Figure 7:
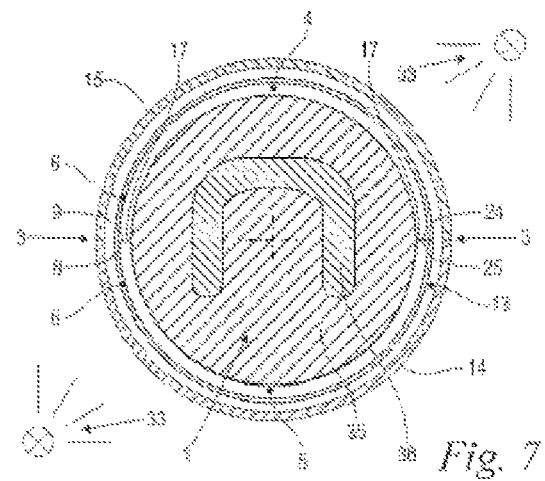
FIG. 7 shows the decorative part coated in the molding tool halves according to FIG. 6 which has been removed from the molding tool halves together with the inserts adhering to it and prepared for complete curing.
Figure 8:
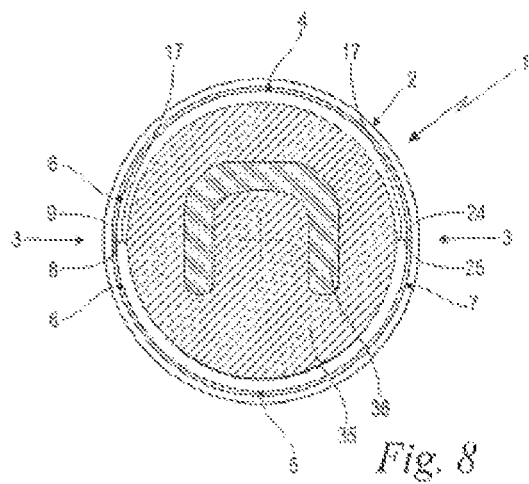
FIG. 8 shows the finished decorative part according to FIG. 7 with the inserts being removed.

FIG. 1 shows, in a schematic sectional view, two support parts 4, 5, with decorative layers 6 applied all-over onto the outer side which are not represented here, but shown in FIGS. 4, 6, 7, 8, for producing a decorative part 1 schematically represented in FIG. 8 in a cross-section. The decorative part 1 (FIG. 8) is in particular provided for a motor vehicle and in the shown embodiment designed as a rim of a steering wheel. The decorative part 1 (FIG. 8) comprises according to FIG. 1, at least two, here exactly two, support parts 4, 5 to be connected along connecting joints 3 which are, however, not yet connected according to FIG. 1.

At least one of the support parts 4, 5, here both support parts 4, 5, are provided with first fixing means and second fixing means for the mutual position orientation of both support parts 4, 5. The first fixing means are formed by latches 18 and latch edges 20 allocated to the latches 18, while the second fixing means are formed by latches 19 and latch edges 21 allocated to the latches 19. The two support parts 4, 5 embodied as half bowls in a cross-section comprise edges 8, 9, 23, 24 allocated to each other, wherein the one support part 4 adjoins, in the mounted state, with its edges 9, 24 the opposite edges 8, 23 of the other support part 5.

Figure 3:
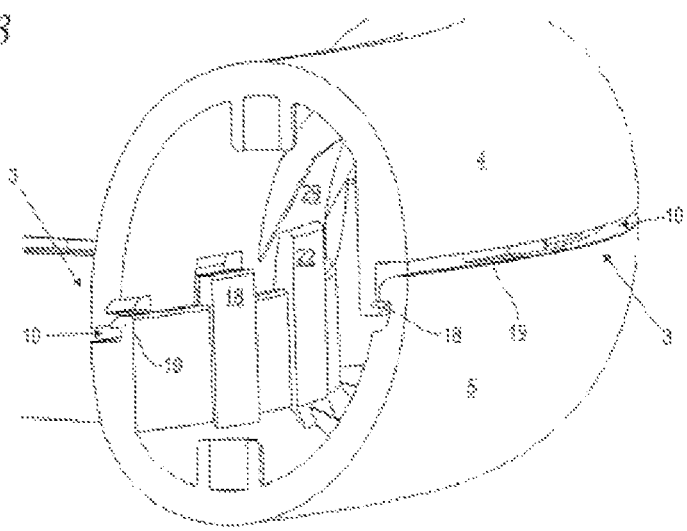
FIG. 3 shows, in a perspective view, the arrangement according to FIG. 2 with further details of the arrangement of latching and centering means.
Figure 4:
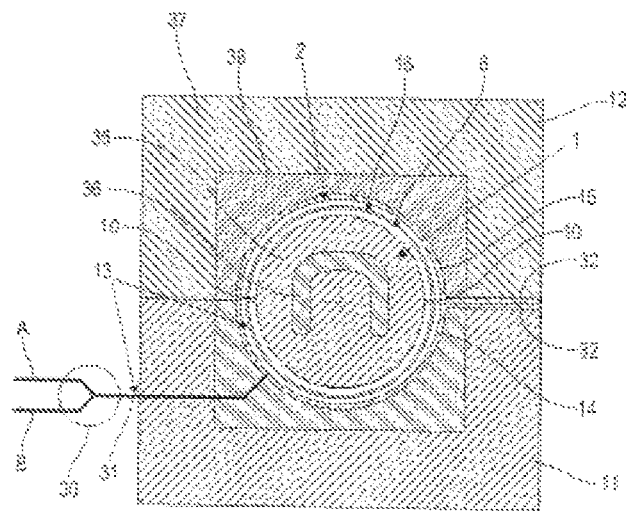
FIG. 4 shows, in a schematic sectional view, the arrangement according to FIGS. 2 and 3 between two closed molding tool halves for coating the outer decorative layer and simultaneously filling the gap between the support parts.

The first and second fixing means embodied as latches 18, 19 and latch edges 20, 21 can be formed, for example, at inserts 14, 15 represented in FIG. 4 by molding tool halves 11, 12 also represented there, or else at the molding tool halves 11, 12 themselves. In the shown embodiment, they are part of the support parts 4, 5 and embodied as such in one piece and monolithically with them as injection-molded plastic part. The same also applies to the centering means represented in FIG. 3 and embodied as centering projections 22 for the mutual alignment of the support parts 4, 5. It might be sufficient for the latches 18, 19, and also for the centering projections 22 (FIG. 3), to only be embodied at one of the support parts 4, 5. In the shown embodiment, both support parts 4, 5 are alternately provided with them. In the shown advantageous embodiment, the first fixing means and also the second fixing means in the form of the latches 18, 19 and the latch edges 20, 21 are arranged directly adjacent to the edges 8, 9 of the support parts 4, 5. The same also applies to the centering means in the form of the centering projections 22 (FIG. 3). One can moreover take from the representation according to FIG. 1 that the latches 18, 19, and also the allocated latch edges 20, 21, are provided with corresponding centering bevels 25, 26, 27, 28 whose functions will be described below.

Figure 2:
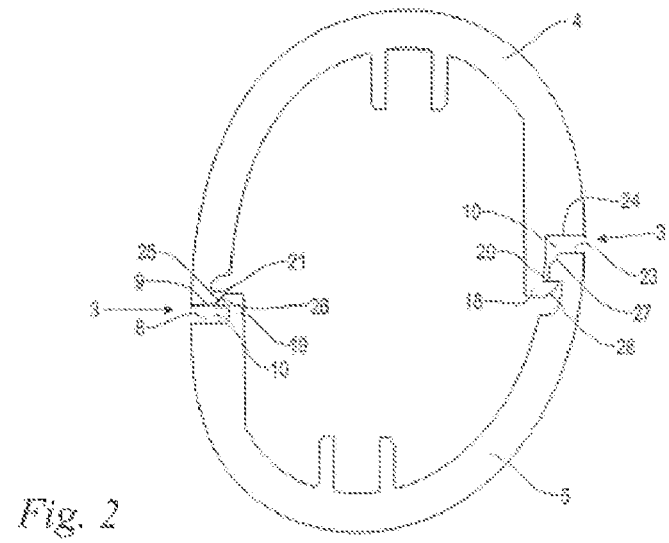
FIG. 2 shows the arrangement according to FIG. 1, wherein the two support parts are latched to each other in a first latch stage forming a gap.

In a first procedure step according to the invention, the two support parts 4, 5 are moved toward each other, starting from the separated position according to FIG. 1, such that first the latch 18 comes to lie with its centering bevel 28 on the centering bevel 27 of the allocated latch edge 20. By further moving the support parts 4, 5 toward each other, the latch 18 snaps behind the allocated latch edge 20, as is represented in FIG. 2. From the combined consideration of FIGS. 1 and 2, one can also see that the latch 18 extends beyond the allocated edge 24 at a greater distance than is the case with the latch 19 relative to the allocated edge 8. The difference of the distances between the latches 18, 19 and the allocated edges 24, 8 is dimensioned such that the longer or higher latch 18 can, corresponding to the representation acc. to FIG. 2, snap barely behind its allocated latch edge 20, while simultaneously the shorter, lower latch 19 rests with its centering bevel 26 on the centering bevel 25 of the allocated latch edge 21. According to FIG. 2, a first latch stage is formed thereby in which the two support parts 4, 5 are held spaced at a distance to each other at the connecting joints 3, each forming a gap 10 between the facing edges 8, 9 or the facing edges 23, 24. The width of the gap or gaps 10 is preferably smaller 2 mm, and in particular about 1.5 mm.

FIG. 3 shows, in a perspective sectional view, the arrangement according to FIG. 2, according to which in this state, the centering projections 22 abut against inner surfaces 29 of the support parts 4, 5, and thereby cause a mutual centering of the two support parts 4, 5 in the lateral direction, that means transverse to the closing direction of the two support parts 4, 5, or in the plane spanned by the connecting joints 3 (FIG. 1), respectively. In FIG. 3, one can moreover see that the first fixing means and the second fixing means in the form of the latches 18, 19 and the latch edges 20, 21, and also the centering projections 22, are arranged alternately along the connecting joints 3. This alternating arrangement means that latches 18 and latches 19, and at certain distances also centering projections 22, are alternately arranged along a connecting joint 3. It is moreover provided that, with respect to a latch 18, opposite a connecting joint 3, a latch 19 is arranged at the other connecting joint 3, and vice-versa.

For producing the decorative part 1, here a steering wheel, the support parts 4, 5 prepared in this manner are inserted between two molding tool halves 11, 12 corresponding to the schematic sectional representation according to FIG. 4. In FIGS. 1 to 3, only the two unworked support parts 4, 5 are represented for a better overview. Actually, both support parts 4, 5 are provided with one decorative layer 6 each on their outer visible sides 2 (FIG. 8), where the decorative layers 6, just as the support parts 4, 5, abut against each other with their edges 8, 9, 23, 24. In the state according to FIGS. 2 to 4, the gaps 10 also extend between the edges of the decorative layers 6. Moreover, in preparation before the production of the first latch stage (FIGS. 2, 3), a core is inserted between the two support parts 4, 5, which is formed by a supporting metal core 36 and a foamed foam core 35 of a shock-absorbing rigid foam.

For the production of the decorative part 1 or other comparable decorative parts according to the inventive method, at least two molding tool halves 11, 12 according to FIG. 4 are employed. Both molding tool halves 11, 12 each comprise one mold cavity for the formation of which optionally one insert 14, 15 each is inserted in one molding tool half 11, 12 each. For the inserts 14, 15, different materials can be considered. Preferably, the inserts 14, 15 are made of plastics, and in the shown embodiment, they are made of polyolefin. Here, the inserts 14, 15 are transparent and optionally comprise integrally molded light conductors 32 whose function will be described more in detail in connection with FIGS. 6, 7.

Moreover, the molding tool halves 11, 12 each comprise one basic mold 37 of simple tool steel into which one mold insert 38 is inserted each for supporting the inserts 14, 15 of higher-quality, more resistant steel. However, an embodiment where mold inserts 38 are omitted and the inserts 14, 15 are directly placed into a shaping of the basic molds 37 can also be suitable. In the shown embodiment, two molding tool halves 11, 12 are provided. With complicated sectional shapes, however, a higher number of molding tool halves 11, 12 and inserts 14, 15 might also be suitable. In any case, a number of molding tool halves 11, 12 with inserts 14, 15 by which the transparent cover layer 7 (FIG. 8) can be completely molded should be selected.

The two molding tool halves 11, 12 are represented in FIG. 4 in a closed state where the inserts 14, 15 adjoin each other in the parting plane between the two molding tool halves 11, 12 in a flush and closed manner. By this, the inserts 14, 15 define a mold cavity in which the blank of the decorative part 1 is inserted with the two support parts 4, 5 held spaced at a distance to each other with gaps 10. The blank is inserted between the inserts 14, 15 in the mold such that a hollow space 16 is formed between its decorative layers 6 and the surfaces of the inserts 14, 15 facing the decorative layers 6 which here has a circular cross-section by way of example.

A schematically indicated injection channel 31 to which a mixing head 30 is connected at the outer side of the casting mold ends in the aforementioned hollow space 16. Two separate, low-viscosity plastic components A, B are supplied to the mixing head 30 and mixed in the mixing head 30. In the mixed state of the plastic components A, B, a chemical reaction is initiated leading to polyaddition, polymerization or another form of polymer reaction and thus to curing, whereby a transparent reaction plastic 13 is formed. The reaction plastic 13 can be a thermosetting plastic or a thermoplastic and is in either case transparent.

The pot life of the reaction plastic 13 is preferably at least one minute and is suitably within a range of up to and including one hour to up to and including two hours. In particular, the reaction plastic 13 has a pot life that is longer than the cycle time of the process in the molding tool halves 11, 12. So, the pot life within which the reaction plastic 13 can be processed is longer than the stay of the decorative part 1 or its blank, respectively, between the molding tool halves 11, 12. During this pot life, the reaction plastic 13 is injected into the mold through the injection channel 31 where the hollow space 16 is completely filled. The gaps 10 which the reaction plastic 13 penetrates are also part of the hollow space 16. Moreover, it can be a suitable option that the reaction plastic 13 penetrates between the support parts 4, 5 and the foam core 35. The injection process takes considerably less time than the mentioned pot life. Meanwhile, the polymer reaction has only progressed to such an extent that the reaction plastic 13 maintains its low viscosity and therefore only a low injection pressure is required. The inserts 14, 15 elastically flexible for themselves, however, flatly adjoin in the corresponding shapings of the molding tool halves 11, 12, so that they cannot yield under the action of the injection pressure. The low injection pressure acting on the blank of the decorative part 1 from all sides is neither sufficient to deform the blank.

Following the aforementioned injection process, the support parts 4, 5 held spaced at a distance to each other are moved toward each other such that the gaps 10 close while the transparent reaction plastic 13 is still within its pot life, that means it can be displaced in a liquid state. This closing or moving toward each other of the two support parts 4, 5 can be accomplished by not represented contrivances, for example dies or movably arranged mold inserts 38.

Figure 5:
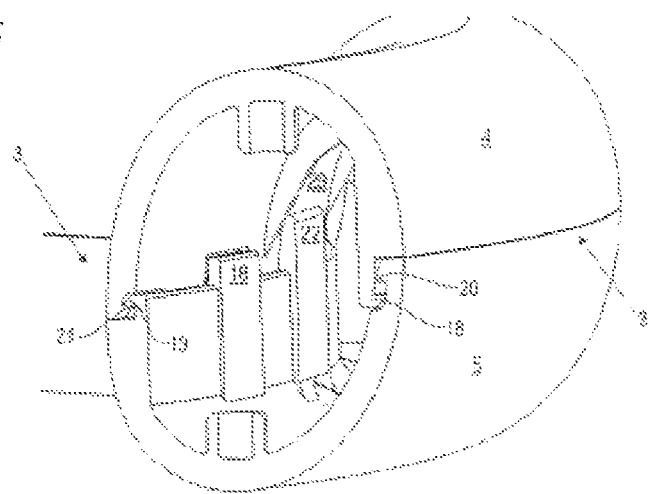
FIG. 5 shows the arrangement according to FIG. 3 in a second latch stage with the gap being closed.

FIG. 5 shows the arrangement according to FIG. 3 in the above described state in which the gaps 10 (FIG. 3) are closed at the connecting joints 3. The support parts 4, 5 are lying with their edges 8, 9, 23, 24 flush against each other. Here, the two support parts 4, 5 are fixed against each other without gaps by the second fixing means described in the beginning. Starting from the state according to FIGS. 2, 3, the two support parts 4, 5 are moved toward each other in the closing direction to such an extent that now also the latches 19 grip behind the allocated latch edges 21, forming a second latch stage. The opposite latch edges 20 of the first latch stage have an undercut that is so distinct that the latches 18 of the first latch stage can follow the additional latch path to the second latch stage. Instead of a second latch stage, however, for example, frictional fixing of both support parts 4, 5 against each other can be suitable, as described more in detail above.

FIG. 6 shows the arrangement according to FIG. 4 with the two support parts 4, 5 according to FIG. 5 that are closed completely and without gaps in the second latch stage. One can see that the decorative layers 6 applied onto the support parts 4, 5 are also lying flush against each other with their facing edges. The still liquid reaction plastic 13 previously injected into the gaps 10 in-between (FIG. 4) is displaced from the gaps 10 by the aforementioned closing process of the two support parts 4, 5 (FIGS. 3, 4). The same also applies to amounts of the reaction plastic 13 possibly penetrated between the support parts 4, 5 and the foam core 35. Thus, residual amounts of the reaction plastic 13 remain in the closed gaps 10 which are only so small that these are barely visible at the later decorative part 1 (FIG. 8), but result in a reliable and very stable conglutination between the support parts 4, 5 including their decorative layers 6 at the edges 8, 9, 23, 24, and optionally also between the support parts 4, 5 and the foam core 35.

In the state according to FIG. 6, in which the hollow space 16 is completely filled with the reaction plastic 13, it might be suitable to feed in ultraviolet light from a UV light source 33, via the light conductors 32 optionally integrally molded at the inserts 14, 15, corresponding to an arrow 34, while the molding tool halves 11, 12 are still closed. Thereby, complete curing, at least precuring, of the reaction plastic 13 in the casting mold can be caused, since the light uniformly acts on the reaction plastic 13 and initiates or accelerates a polymer reaction there, which is accomplished via the light conductors 32 into the inserts 14, 15, also designed to be transparent and also acting as light conductors. As an alternative or in addition, it might also be suitable to feed in UV light via light conductors that separately extend in the molding tool halves 11, 12 and are not arranged at the inserts 14, 15.

Preferably, however, the molding tool halves 11, 12 are separated and the casting molds opened thereby before the reaction plastic 13 has completely polymerized or cured, respectively. In precuring by means of UV light, or, if there are no light conductors 32, without the action of UV light, this is done at a point in time when the reaction plastic 13 has achieved sufficient dimensional stability permitting further processing outside the molding tool halves 11, 12. The mutual position fixation of the two support parts 4, 5 is here ensured by the above described fixing and centering means. Moreover, one benefits from the fact that the inserts 14, 15 adhere to the reaction plastic 13 and are only loosely inserted in the molding tool halves 11, 12. So, the blank onto which the reaction plastic 13 has been injected is removed from the casting mold or the molding tool halves 11, 12 together with the inserts 14, 15 adhering thereto before the reaction plastic 13 has completely cured.

This state of the decorative part blank is shown in the schematic sectional representation according to FIG. 7 according to which the blank is coated with the reaction plastic 13 at its outer side of its decorative layers 6 adjoining in a flush manner. At the outer side of the reaction plastic 13, the inserts 14, 15 adhere to it and keep the not yet completely cured plastic material in shape. The arrangement according to FIG. 7 is subsequently subjected to complete curing. For this, it can be placed into a not represented hardening furnace. There, curing of the reaction plastic 13 is done under the action of temperature elevated compared to ambient temperature and also under the action of UV light from UV light sources 33, the UV light penetrating through the transparent inserts 14, 15 to the reaction plastic 13. However, it can also be suitable to only employ UV light or heat as an alternative, or not at all.

The reaction plastic 13 is provided with a not represented additive for reducing its adherence to the inserts 14, 15. Due to the above mentioned long pot life of the reaction plastic 13, the additive can get to the parting plane between the reaction plastic 13 and the inserts 14, 15 and develop its separating effect there. An embodiment of the inserts 14, 15 of a suited plastic material, here polyolefin, contribute to further reduce adherence. Upon complete curing of the reaction plastic 13, the inserts 14, 15 can be removed. Before the injection process according to FIGS. 4, 6, one therefore omitted a separate application of separating agents onto the inner surfaces of the inserts 14, 15.

After the inserts 14, 15 have been removed from the arrangement according to FIG. 7, the decorative part 1 is finished as is shown in the schematic sectional representation according to FIG. 8. One can see there that the foam core 35 with the foamed metal core 36 is enclosed by the two support parts 4, 5 and closed all around in the shown cross-section. The decorative layers 6 applied on the outer side onto the two support parts 4, 5 are also closed all around with respect to the shown cross-section, and abut at the edges 8, 9, 23, 24 (FIG. 1) in a flush manner. By the reaction plastic 13 previously injected into the gap 10 according to FIG. 4, in its cured state, at least approximately gap-free bond seams replaced the previously closed gap 10, by means of which the decorative layers 6 and the support parts 4, 5 are glued to each other at their facing front faces or edges 8, 9, 23, 24. By the cured reaction plastic 13, one can optionally also cause an at least partial conglutination between the support parts 4, 5 and the foam 35. Moreover, the decorative layers 6 facing the visible side 2 are provided with a transparent cover layer 7, wherein the bond seams 17 in the connecting joints 3 are monolithically formed in one piece with the transparent cover layer 7 by the transparent and cured reaction plastic 13.

The transparent cover layer 7 can be transparent or milky with or without coloration. The decorative part 1 comprises, in the shown embodiment, a cross-section with a closed surrounding, radially external visible side 2 and also surrounding decorative layers 6 and cover layers 7. According to the inventive method or in further inventive embodiments of the decorative part 1, however, disconnected or only partially surrounding, or differently formed visible sides 2 with decorative layers 6 and cover layers 7 can be provided. Moreover, an embodiment can be suitable where only one connecting joint 3, or else a higher number of connecting joints 3 is provided. The decorative layer 6 can be, for example, a precious wood veneer, a decorative woven, a sheet metal or the like.

Above, an embodiment of the invention is described in which the bond seam 17 in the connecting joint 3 is monolithically formed from the transparent reaction plastic 13 in one working step in one piece with the cover layer 7. However, it can also be suitable to separate the two procedure steps of the formation of the bond seam 17 and the formation of the cover layer 7 and to carry them out sequentially. Here, first molding tool halves 11, 12 are employed with a hollow space 16 adapted such that the transparent reaction plastic 13 only penetrates the connecting joint 3, but does not flow around the visible side 2 and therefore neither forms the cover layer 7. After the injection of the connecting joint 3, the support parts 4, 5 held spaced at a distance as described above are moved toward each other and fixed while the gap 10 is being closed, as also described above, while the bond seam 17 is formed.

The support parts 4, 5 glued to each other in this manner, or the blank formed from them, are then subsequently provided with a cover layer 7 in a separate procedure step. This can be accomplished by applying, for example, a transparent thick-film PU varnish. Preferably, a separate injection with the transparent reaction plastic 13 is effected for this which monolithically connects in one piece with the transparent reaction plastic 13 of the bond seam 17, while the cover layer 7 is being formed.

The invention claimed is:

1. A method for producing a decorative part that includes a closed cross-section with an external visible side and two support parts connected along a connecting joint, the method comprising:

inserting the support parts between two molding tool portions such that the support parts are held with a gap formed between edges of the support parts which are adjoinable by the connecting joint, wherein the held support parts are held in a first latch stage in a latching manner to form the gap;

injecting a reaction plastic between the two molding tool portions such that the reaction plastic penetrates the gap formed between the held support parts;

moving the held support parts toward each other such that the gap reduces while the injected reaction plastic is still liquid; and fixing the moved support parts relative to each other at least until the reaction plastic has sufficiently cured so as to form a bond seam as the connecting joint.

2. The method according to claim 1 wherein the reaction plastic is transparent and the two support parts are each provided with a decorative layer configured to face the visible side, wherein the injecting step is performed such that the support parts are coated in the two molding tool portions with the transparent reaction plastic on an outer side of the decorative layers with respect to the cross-section, and wherein the fixing step is performed such that the support parts are fixed against each other at least until the transparent reaction plastic has sufficiently cured so as to form a transparent cover layer on the outer side of the decorative layers and to form the bond seam in one-piece with the cover layer.

3. The method according to claim 1 wherein the fixing step is performed with the support parts fixed relative to each other in a second latching stage in a latching manner while the gap is reduced.

4. The method according to claim 2 further comprising positioning an insert in each of the molding tool portions and closing the molding tool portions such that a hollow space is formed between each insert and a respective one of the decorative layers, wherein the injecting step is performed such that the hollow space is injected with the transparent reaction plastic, and wherein the method further comprises removing the support parts, together with the inserts adhering to them, from the molding tool portions.

5. The method according to claim 4 wherein the removing step is performed before the reaction plastic has completely cured, and wherein complete curing of the reaction plastic is accomplished with the inserts adhering to the support parts outside the molding tool portions.

6. The method according to claim 1 wherein the decorative part is a steering wheel for a motor vehicle.

7. A method for producing a decorative part that includes a closed cross-section with an external visible side and two support parts connected along a connecting joint, wherein the support parts are each provided with a decorative layer facing the visible side, the method comprising:

inserting the support parts with the decorative layers between two molding tool portions such that the support parts are held with a gap formed between edges of the support parts which are adjoinable by the connecting joint;

injecting a transparent reaction plastic between the two molding portions such that the transparent reaction plastic coats the support parts on an outer side of the decorative layers with respect to the cross-section and such that the transparent reaction plastic penetrates the gap formed between the held support parts;

moving the held support parts toward each other such that the gap reduces while the injected transparent reaction plastic is still liquid; and fixing the moved support parts relative to each other until the transparent reaction plastic has sufficiently cured so as to form a transparent cover layer on the outer side of the decorative layers and to form a bond seam as the connecting joint such that the bond seam is monolithically formed in one-piece with the cover layer.

8. The method according to claim 7 further comprising positioning an insert in each of the molding tool portions and closing the molding tool portions such that a hollow space is formed between each insert and a respective one of the decorative layers, wherein the injecting step is performed such that the hollow space is injected with the transparent reaction plastic, and wherein the method further comprises removing the support parts, together with the inserts adhering to them, from the molding tool portions.

9. The method according to claim 8 wherein the removing step is performed before the reaction plastic has completely cured, and wherein complete curing of the reaction plastic is accomplished with the inserts adhering to the support parts outside the molding tool portions.

10. The method according to claim 7 wherein the held support parts are held in a first latch stage in a latching manner to form the gap.

11. The method according to claim 10 wherein the fixing step is performed with the support parts fixed relative to each other in a second latching stage in a latching manner while the gap is reduced.

12. The method according to claim 7 wherein the decorative part is a steering wheel for a motor vehicle.

* * * * *